US 7,700,220 B2

(12) United States Patent
Matsuoka et al.

(10) Patent No.: US 7,700,220 B2
(45) Date of Patent: Apr. 20, 2010

(54) FUEL CELL

(75) Inventors: Koji Matsuoka, Gunma (JP); Yoshihiro Ikoma, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 748 days.

(21) Appl. No.: 11/524,527

(22) Filed: Sep. 21, 2006

(65) Prior Publication Data

US 2007/0077465 A1    Apr. 5, 2007

(30) Foreign Application Priority Data

Sep. 21, 2005  (JP)  ............... 2005-274234
Aug. 28, 2006  (JP)  ............... 2006-230109

(51) Int. Cl.
    *H01M 4/86*    (2006.01)
(52) U.S. Cl. ........................... 429/40; 429/44
(58) Field of Classification Search ............ 429/40, 429/44; 501/330
    See application file for complete search history.

(56) References Cited

U.S. PATENT DOCUMENTS

| 4,659,559 | A  | * | 4/1987  | Struthers ............... 429/44 X |
| 6,663,998 | B2 | * | 12/2003 | Nørskov et al. ........... 429/40 |
| 6,749,892 | B2 | * | 6/2004  | Chang ................... 429/40 X |

FOREIGN PATENT DOCUMENTS

| JP | 04-141236       | 5/1992 |
| JP | 2005-515063     | 5/2005 |
| WO | WO 03/061827 A2 | 7/2003 |

OTHER PUBLICATIONS

Chinese Office Action, with English Translation, issued in Chinese Patent Application No. CN 200610139807.9, dated Mar. 7, 2008.
Kohei Miyazaki et al. "Electro-oxidation of Methanol on Gold Nanoparticles Supported on Pt/MoOx/C" Journal of the Electrochemical Society (2005).
Koji Matsuoka et al. "Methanol Oxidation on Pt-Ru Catalyst with Deposited Ultra-Fine Gold" Proceedings of the 45th cell forum, the Committee of battery Technology, the Electrochemical Society of Japan (11/27 Heisei 16), pp. 620-621 with English Translation.

* cited by examiner

*Primary Examiner*—Stephen J. Kalafut
(74) *Attorney, Agent, or Firm*—McDermott Will & Emery LLP (57) ABSTRACT

A fuel cell is provided which can enhance the CO resistance to thereby improve the voltage characteristics thereof. A fuel cell includes an electrolyte layer, a first electrode provided on one surface of the electrolyte layer, and a second electrode provided on the other surface of the electrolyte layer. In this fuel cell, a reaction fluid to be supplied to the first electrode contains carbon monoxide or carbon monoxide is generated from a reaction fluid having been supplied to the first electrode. The first electrode of the fuel cell includes a first catalyst material (Pt) having a function of extracting an electron from the reaction fluid, a second catalyst material (WAu) having a function of reducing the activation energy for conversion of carbon monoxide to carbon dioxide, and an oxygen-supplying material (Ru) supplying oxygen.

8 Claims, 8 Drawing Sheets

FUEL CELL

BACKGROUND OF THE INVENTION

1. Field of the Invention

The present invention relates to a fuel cell, and in particular, to a fuel cell having high CO resistance.

2. Description of the Related Art

In this age, the new technologies that have evolved, such as IT and biotechnology, have had a global impact. Even in such circumstances, however, the energy industry remains one of the largest basic industries. In recent years, as environmental awareness including prevention of global warming has grown, expectations regarding the introduction of a so-called new energy have increased. This new energy has advantages in terms of reduction in power transmission losses and security of power supply, in addition to environmental friendliness, given that the energy can be produced in dispersed sites close to the electrical power consumers. Furthermore, as a secondary effect, it is expected that new related industries will be created through the development of this new energy. Efforts to develop this new energy began in earnest, triggered by the oil crisis of approximately 30 years ago. At present, the following types of new energy are still at the development stage, but are moving toward practical use: reproducible energy produced by solar photovoltaic power generation or the like, recycled energy produced by waste power generation or the like, high efficiency energy produced by a fuel cell or the like, and energy in new fields, as typified by clean energy vehicles.

Among these examples, the energy produced by a fuel cell is one of the types receiving the most attention from industry. A fuel cell generates electricity and heat simultaneously through chemical reaction of oxygen in an atmosphere with hydrogen, produced through the reaction of water vapor with natural gas, methanol, or the like. A fuel cell produces only water as a by-product of power generation. In addition to this, high efficiency is obtained even in a low power output range, and the electrical power generation is not affected by weather, and therefore, is stable. In particular, the polymer electrolyte fuel cell has received significant attention as one of the next-generation standard power sources for applications such as use in vehicles, mobile use, and stationary use such as in housing. The following technologies have been developed for commercialization based on the polymer electrolyte fuel cell: a technology employing a small size catalyst of nanometer order, in order to improve power generation performance (see Published Japanese translation of PCT international application No. 2005-515063); and a technology in which gold nanoparticles are added to a catalyst in order to improve CO (carbon monoxide) resistance (see Koji Matsuoka, Kohei Miyazaki, Yasutoshi Iriyama, Takeshi Abe, and Zempachi Ogumi, "Methanol Oxidization Characteristics of Pt-Ru Catalyst Supported on Gold Ultra-fine Particles", Proceedings of the 45th cell forum, the Committee of Battery Technology, the Electrochemical Society of Japan, (11/27 Heisei 16), pp. 620-621, and Kohei Miyazaki, Koji Matsuoka, Yasutoshi Iriyama, Takeshi Abe, and Zempachi Ogumi, "Electrooxidation of Methanol on Gold Nanoparticles Supported on Pt/MoO$_x$/C", Journal of The Electrochemical Society, 152(9) A1870-A1873 (2005).

In the case where hydrogen is produced through the reaction of natural gas or methanol with water vapor as mentioned above, ideally, 80% of hydrogen (H$_2$) and 20% of carbon dioxide (CO$_2$) are supplied to a fuel cell through the reaction represented by the chemical equations (1) and (2). However, since carbon monoxide (CO) generated during the processes represented by the chemical equations (1) and (2) cannot be fully eliminated, CO in an amount of several ppm to several tens of ppm enters the anode of the fuel cell.

$$CH_4+H_2O \rightarrow 3H_2+CO \qquad (1)$$

$$CO+H_2O \rightarrow CO_2+H_2 \qquad (2)$$

Furthermore, in the case where an aqueous solution containing methanol (organic fuel) is supplied to a fuel cell, the reaction represented by the chemical equation (3) occurs on the anode side. However, CO which is not converted into carbon dioxide during the reaction process remains at the anode.

$$CH_3OH+H_2O \rightarrow 6H^++6e^-+CO_2 \qquad (3)$$

Hence, in a catalyst layer for the anode of a fuel cell which generates electrical power by means of organic fuel or reformed gas obtained through reforming reaction (transformation reaction), a catalyst such as platinum (Pt) which has a function of converting H$_2$ to protons (H$^+$) has usually been employed. In addition to platinum, a PtRu catalyst has also been employed to which ruthenium (Ru) is added in order to prevent the reduction of catalytic activity caused by CO poisoning of Pt. Materials such as ruthenium (Ru) have properties that promote the conversion of the CO that sticks to Pt to CO$_2$. Furthermore, a technology has been reported which improves CO resistance by mixing a catalyst composed of Pt and Ru or Pt and molybdenum (Mo) with gold nanoparticles. However, this technology is still in the research stage. Although fuel cells appear on the verge of becoming genuinely widespread, it has been found that, at present, the CO resistance at the anode is not sufficient.

SUMMARY OF THE INVENTION

The present invention has been developed in view of the foregoing problems. It is thus a general purpose of the present invention to provide a technology that enhances the CO resistance of a catalyst to thereby improve the characteristics of fuel cells.

In order to achieve the foregoing object, one embodiment of the present invention relates to a fuel cell which includes an electrolyte layer, a first electrode provided on one surface of the electrolyte layer, and a second electrode provided on the other surface of the electrolyte layer, and in which a reaction fluid to be supplied to the first electrode contains carbon monoxide or carbon monoxide is generated from a reaction fluid having been supplied to the first electrode. In this fuel cell, the first electrode includes a first catalyst material having a function of extracting an electron from the reaction fluid, a second catalyst material having a function of reducing activation energy for conversion of the carbon monoxide to carbon dioxide, and an oxygen-supplying material which supplies oxygen.

In the present specification, any fuel and oxidant required for a fuel cell to generate power are collectively called the reaction fluid. Furthermore, activation energy is the minimum energy required for the reactants to initiate a reaction in order for a chemical reaction to proceed. Thus, among the reactant molecules, molecules having energy larger than the activation energy can be converted to product molecules through recombination of bonds between atoms.

Examples of the fuel cell in which a reaction fluid to be supplied to the first electrode contains carbon monoxide (CO) include a fuel cell which employs reformed gas supplied thereto as fuel. In this instance, the reformed gas is formed by reforming hydrocarbon-based raw fuel such as LPG or city gas by means of a reforming apparatus. However, the present invention is not limited thereto. For example, when air is employed as oxidant, this air may contain CO. Furthermore, examples of a fuel cell in which carbon monoxide is generated from a reaction fluid having been supplied to the first electrode include a liquid fuel direct supply fuel cell. In this fuel cell, liquid fuel such as an aqueous solution of methanol is directly supplied to the fuel cell, and thus CO may be generated as an intermediate product of the anode reaction.

In the present invention, by employing the above configuration, even when CO sticks to the first catalyst material, a state in which CO is easily converted to $CO_2$ is maintained by means of the second catalyst material. Therefore, by supplying oxygen (O) from the oxygen-supplying material, the reduction in the ability of the first catalyst material caused by CO poisoning can be suppressed (and CO resistance is therefore improved) to thereby improve the voltage characteristics of the fuel cell.

Furthermore, another embodiment of the present invention relates to a catalyst employed in a fuel cell. The catalyst includes a first catalyst material having a function of extracting an electron from a reaction fluid, a second catalyst material having a function of reducing activation energy for conversion of carbon monoxide to carbon dioxide, and an oxygen-supplying material which supplies oxygen. According to this catalyst for a fuel cell, even when CO sticks to the first catalyst material, a state in which CO is easily converted to $CO_2$ is maintained by means of the second catalyst material. Therefore, by supplying oxygen (O) from the oxygen-supplying material, CO resistance can be improved, whereby the durability of a fuel cell employing this catalyst can also be improved.

Moreover, the second catalyst material may contain gold and a transition metal selected from group 3 to group 11. Preferably, the particle diameter distribution of the gold has a peak within the range of from 1 nm to 5 nm. Furthermore, preferably, the transition metal has an oxidation-reduction potential within a range in which a standard electrode potential thereof with respect to a standard hydrogen electrode is −0.25 V or more and 0.25 V or less.

The gold particles having the peak of the particle diameter distribution within the range of from 1 nm to 5 nm, or so-called gold nanoparticles, exhibit outstanding CO oxidizing ability. Furthermore, the CO oxidizing ability of the gold nanoparticles can be enhanced by employing, as a material supporting the gold nanoparticles, a transition metal selected from group 3 to group 11, particularly a transition metal having an oxidation-reduction potential within a range in which a standard electrode potential thereof with respect to a standard hydrogen electrode is −0.25 V or more and 0.25 V or less.

Moreover, desirably, the oxygen-supplying material contains at least one selected from the group consisting of magnesium, aluminum, vanadium, chromium, manganese, iron, cobalt, nickel, copper, zinc, zirconium, molybdenum, ruthenium, rhodium, palladium, tin, tungsten, and iridium. When importance is placed on the oxygen supplying ability of the oxygen-supplying material, ruthenium is the optimum choice. However, when chromium, tin, or tungsten is employed as the oxygen-supplying material, a common material can be employed for the oxygen-supplying material and the material supporting the gold nanoparticles, and thus overall costs can be reduced. In addition to the above, it is conceivable that a transition element (transition metal) selected from group 3 to group 11 of the periodic table (from group 3A to group 7A, group 8, and group 1B) can be primarily employed.

Still another embodiment of the present invention relates to a fuel cell wherein the first electrode has a first region contacting a reaction fluid having a lower carbon monoxide concentration and a second region contacting a reaction fluid having a higher carbon monoxide concentration, and wherein the concentration of the second catalyst material in the first region is lower than that in the second region. Yet another embodiment of the present invention relates to a fuel cell wherein the first electrode has a first region contacting a reaction fluid having a lower carbon monoxide concentration and a second region contacting a reaction fluid having a higher carbon monoxide concentration, and wherein the concentration of the oxygen-supplying material in the first region is lower than that in the second region.

The relative concentration of carbon monoxide contained in the reaction fluid is higher in a region close to a discharging portion from which a reaction fluid not reacted at the first electrode is discharged than in a region close to an introduction portion for supplying the reaction fluid to the first electrode. Therefore, in the region contacting a fluid having higher relative carbon monoxide concentration (the second region), CO can be effectively converted to $CO_2$ by increasing the concentration of the second catalyst material or the concentration of the oxygen-supplying material so as to increase the number of reaction sites where CO is brought into close proximity of O.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
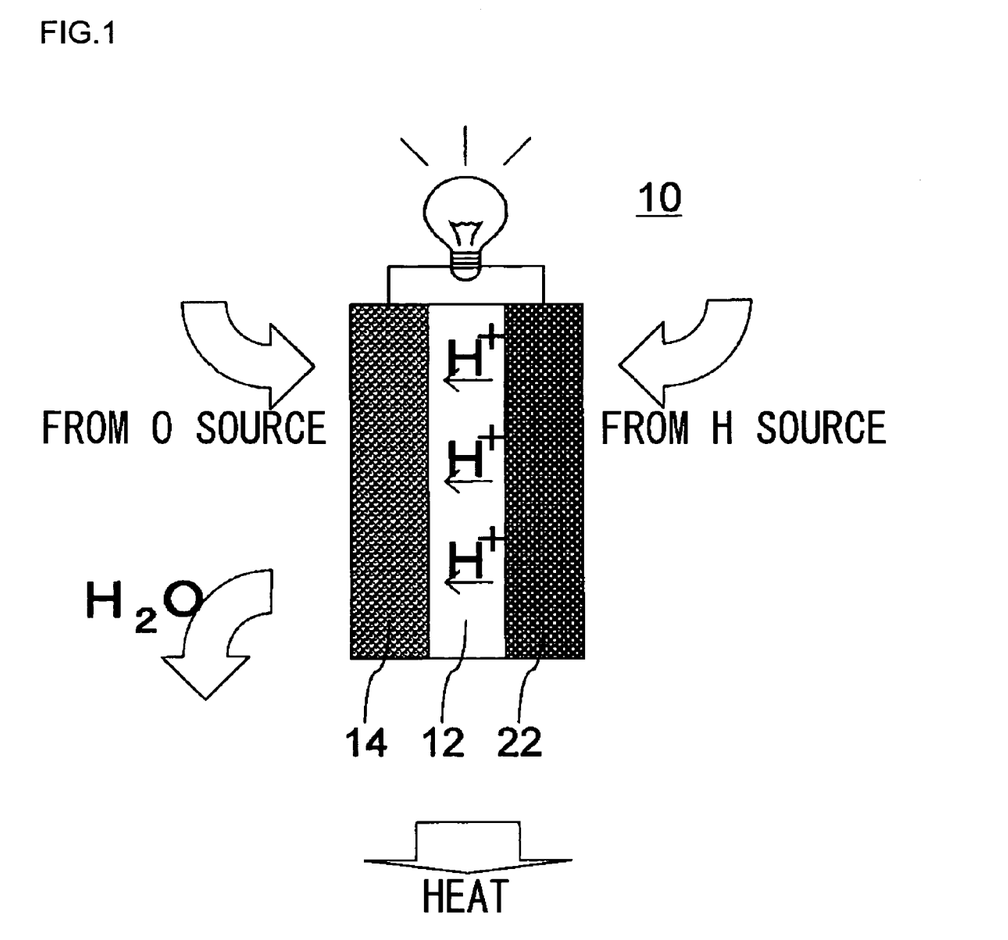
FIG. 1 is a schematic diagram illustrating the configuration of a fuel cell according to the present invention.

Hereinafter, a fuel cell 10 of the present invention will be described in detail with reference to the drawings. As shown in FIG. 1, the fuel cell 10 of the present invention is provided with: a positive electrode (cathode) 14 which is provided on one surface of a solid polymer membrane 12 and at which a reduction reaction occurs by means of an oxygen (O) source such as oxygen in air; and a negative electrode (anode) 22 which is provided on the other surface of the solid polymer membrane 12 and at which an oxidization reaction occurs by means of a hydrogen (H) source such as pure hydrogen, reformed gas, or methanol. Generally, a proton exchange membrane is widely employed for the solid polymer membrane 12. The H-source donates an electron at the anode 22 to form a proton ($H^+$), and the thus-formed proton moves to the cathode 14 through the solid polymer membrane 12 and reacts with the O-source which has received an electron at the cathode 14. Hence, electrical power can be supplied to the outside of the fuel cell 10, and water ($H_2O$) is generated at the cathode 14. Furthermore, since the series of reactions is exothermic, the fuel cell 10 can be used as a co-generation system which draws and utilizes heat as well as electricity, and thus the overall energy efficiency of the fuel cell is improved.

Next, a description will be given of a specific embodiment of the fuel cell 10 having the above basic configuration.

FIRST EMBODIMENT

Figure 2:
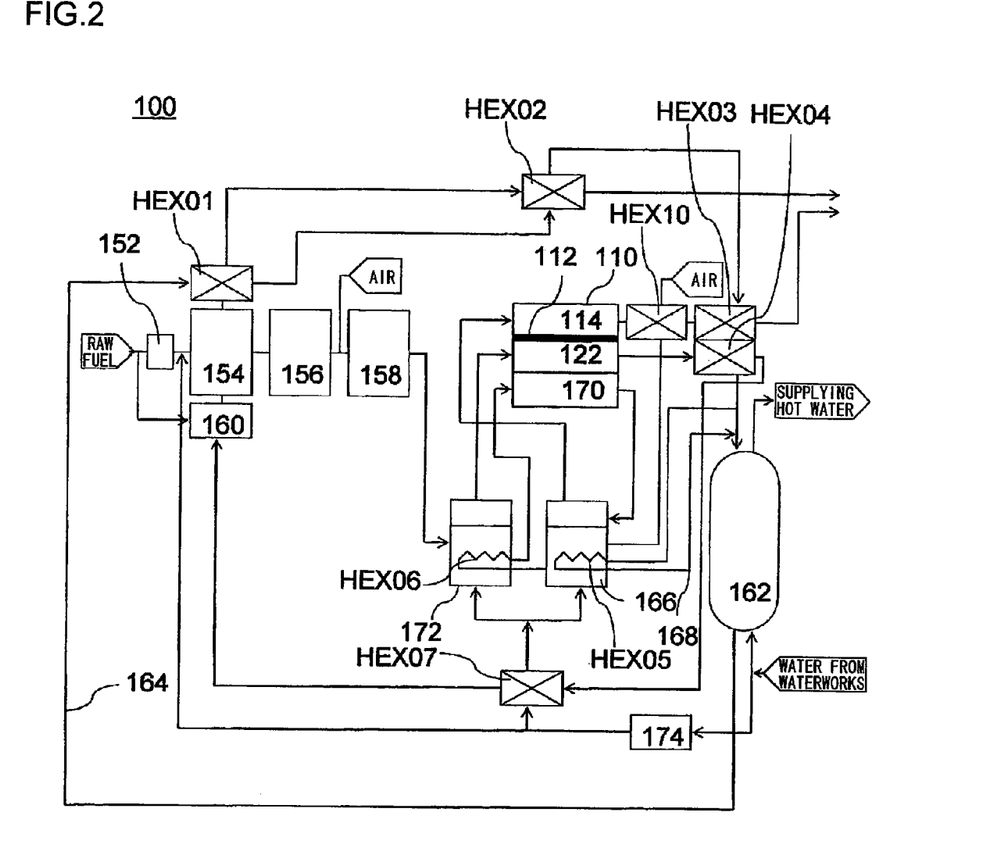
FIG. 2 is a schematic diagram illustrating the configuration of a domestic-use fuel cell co-generation system employing the fuel cell according to the present invention.

In this embodiment, with reference to FIG. 2, a description will be given of a fuel cell 110 employed in a domestic-use fuel cell co-generation system 100. The domestic-use fuel cell co-generation system 100 includes: a reforming apparatus which reforms raw fuel (hydrocarbon-based fuel) such as LPG or city gas and generates reformed gas containing hydrogen (fuel) in an amount of about 80%; a fuel cell 110 which generates electrical power using the reformed gas supplied from the reforming apparatus and oxygen (oxidant) in air; and a hot water storage apparatus which recovers and stores heat generated in the reforming apparatus and the fuel cell 110 in the form of hot water (water of 40° C. or higher). Thus, this system has both a power generation function and a hot water supplying function.

Normally, as safety measures in case of a gas leak, an odor is added, by use of a sulfide, to the raw fuel, such as LPG or city gas, supplied to homes. However, the sulfide causes catalyst deterioration in the reforming apparatus. Thus, the sulfide in the raw fuel is first removed in the reforming apparatus by means of a desulfurizer 152. The raw fuel, having been desulfurized by means of the desulfurizer 152, is then mixed with water vapor. The mixture is subjected to water vapor reforming by means of a reformer 154 and is introduced to a transformer 156. A reformed gas containing about 80% hydrogen ($H_2$), about 20% carbon dioxide ($CO_2$), and 1% or less carbon monoxide (CO) is generated by means of the transformer 156. However, in the present system 100, the reformed gas is supplied to the fuel cell 110 operated at low temperatures (100 C. or lower) where the cell is likely to be affected by CO, and thus the reformed gas is mixed with oxygen to selectively oxidize CO by means of a CO remover 158. The use of the CO remover 158 means that the CO concentration in the reformed gas can be reduced to 10 ppm or less.

The reforming apparatus includes at least the reformer 154 and the transformer 156. When the gas supplied to homes is employed as raw fuel, as in the present system 100, the reforming apparatus further includes the desulfurizer 152. When a low temperature type fuel cell 110 such as a polymer electrolyte fuel cell is employed as the fuel cell 110, the reforming apparatus further includes the CO remover 158.

Since the water vapor reforming is an endothermic reaction, a burner 160 is provided in the reformer 154. At startup of the reforming apparatus, the raw fuel is also supplied to the burner 160 to raise the temperature of the reformer 154. Once the present system 100 is operating stably, the supply of raw fuel to the burner 160 is terminated and unreacted fuel discharged from the fuel cell 110 is supplied to the burner 160, whereby heat is supplied to the reformer 154. Since the exhaust gas having supplied heat to the reformer 154 through the burner 160 still retains a large amount of heat, the exhaust gas is subjected to heat exchange with water in a hot water storage tank 162 by means of heat exchangers HEX01 and HEX02. Then, this water, subjected to heat exchange (HEX03) with an exhaust gas from the cathode 114 of the fuel cell 110, is further subjected to heat exchange (HEX04) with an exhaust gas from an anode 122, and then returns to the hot water storage tank 162. In order to utilize the temperature of the water (hot water) having passed through the heat exchanger HEX04 for heating or cooling a cathode-side humidification tank 166, a branched tube 168 is provided in a water tube 164 passing through the heat exchangers HEX01 to HEX04. At the time of, for example, startup of the present system 100, the temperature of the cathode-side humidification tank 166 is low. In such a case, the water passes through the heat exchanger HEX04 and then the branched tube 168. Then, at a heat exchanger HEX05, the water supplies heat to the cathode-side humidification tank 166 and returns to the hot water storage tank 162.

This cathode-side humidification tank 166 also serves as a cooling water tank, and the water in this humidification tank 166 cools the fuel cell 110 and returns to the tank 166. As described above, the temperature of the fuel cell 100 is low at the time of, for example, startup of the present system 100, and thus the fuel cell 110 can be warmed by supplying thereto the cooling water warmed by the heat exchanger HEX05. Furthermore, a cooling water passage 170 through which the cooling water flows is connected to a heat exchanger HEX06 provided in an anode-side humidification tank 172. The cooling water also plays a role in matching approximately the temperature of the cathode-side humidification tank 166 with the temperature of the anode-side humidification tank 172.

The reformed gas from the reforming apparatus is humidified (bubbled, in the case of the present system 100) in this anode-side humidification tank 172 and is supplied to the anode 122. The unreacted fuel not involved in power generation at the anode 122 is discharged from the fuel cell 110 and is supplied to the burner 160. Normally, the fuel cell 110 is operated so as to generate electrical power at temperatures in the range of 70 to 80° C. Since the exhaust gas discharged from the fuel cell 110 has a temperature of about 8020 C., the exhaust gas is subjected to heat exchange in the heat exchanger HEX04 as described above. Subsequently, in a heat exchanger HEX07, the exhaust gas raises the temperature of the water supplied to the cathode-side humidification tank 166 and the anode-side humidification tank 172 and is then supplied to the burner 160.

It is preferable that the water supplied to the cathode-side humidification tank 166 and the anode-side humidification tank 172 is clean water having low electrical conductivity and containing only a small amount of organic materials. Therefore, water supplied from the regional waterworks is subjected to water treatment by use of a reverse osmosis membrane and ion-exchange resin by means of a water treatment apparatus 174, and this treated water is employed as the water to be supplied to the humidification tanks. Furthermore, the water subjected to water treatment is also employed for water vapor reforming by means of the reformer 154. The water from waterworks is also supplied to the hot water storage tank 162. At this time, the water from waterworks is supplied to this storage tank 162 from a lower portion thereof. The water tube 164 draws low temperature water from the lower portion of this storage tank 162 and returns water subjected to heat exchange in each of the heat exchangers to an upper portion of the storage tank 162.

HEX10 is a total enthalpy heat exchanger. The exhaust gas containing unreacted oxygen not involved in power generation at the cathode 114 contains product water generated through heat of about 80° C. and various reactions. Thus, in the total enthalpy heat exchanger HEX10, the exhaust gas supplies heat and moisture to air supplied to the cathode 114. The air to be supplied to the cathode 114 is humidified (bubbled, in the case of the present system 100) in the cathode-side humidification tank 166 and is then supplied to the cathode 114. Furthermore, the exhaust gas having supplied heat and moisture in the total enthalpy heat exchanger HEX10 is further subjected to heat exchange with water in the heat exchanger HEX03 and is discharged to outside the present system 100.

Figure 3:
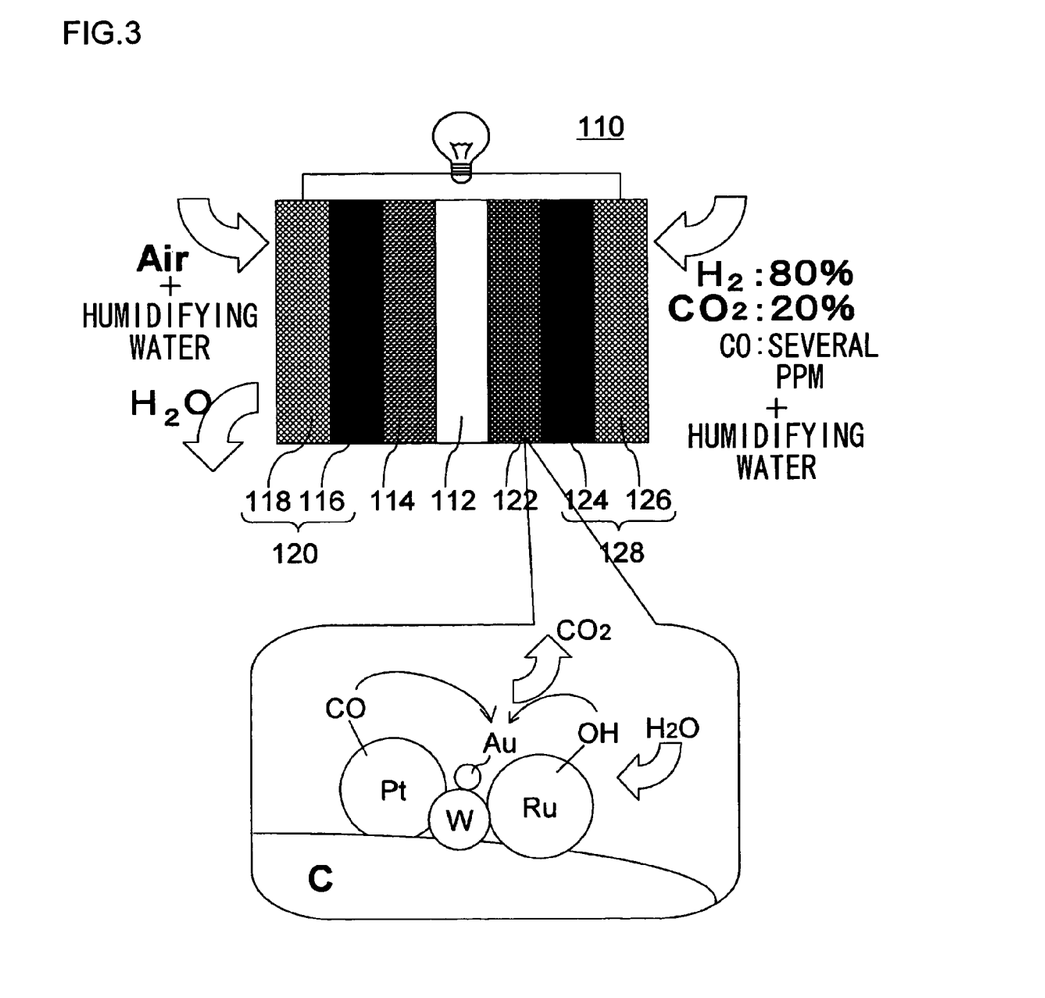
FIG. 3 is a schematic diagram illustrating the configuration of the fuel cell of the present invention employed in a first embodiment.

The fuel cell 110 of this embodiment is provided with diffusion layers 120 and 128 in order to uniformly supply the reformed gas to the cathode 114 and the anode 122 and in order to smoothly discharge product water from the cathode 114 and water condensed in the cathode 114 and the anode 122. The diffusion layers are prepared using carbon paper, carbon woven fabric, or carbon non-woven fabric as a substrate and by applying to the substrate a viscous carbon paste formed mainly of carbon black. In consideration of efficient productivity, the same carbon paper is employed as the substrate for both the diffusion layers 120 and 128, and different diffusion layer pastes, i.e., a cathode-side paste and an anode-side paste, are applied to the respective substrates, as shown in FIG. 3. More specifically, a cathode-side packed layer 116 is prepared by applying a cathode-side diffusion layer paste to a cathode-side substrate 118, drying the paste, and subjecting it to heat treatment. In this case, the packed layer 116 is prepared such that the water repellency (provided by the content of fluororesin) is lower than that on the anode side. Furthermore, an anode-side packed layer 124 is prepared by applying an anode-side diffusion layer paste to an anode-side substrate 126, drying the paste, and subjecting it to heat treatment. In this case, the packed layer 124 is prepared such that the water repellency (provided by the content of fluororesin) is higher than that on the cathode side.

However, general fluororesin (hereinafter referred to as high molecular weight fluororesin) has good binding properties. Therefore, when a large amount of high molecular weight fluororesin is added to the diffusion layer paste, the viscosity increases due to mixing and application, and the fluororesin aggregates as clusters. Therefore, a difficulty arises in the application step. In view of this difficulty, low molecular weight fluororesin, which has an average molecular weight smaller than that of the high molecular weight fluororesin and has very poor binding properties, is also employed. In this case, the low molecular weight fluororesin is responsible for water repellency, and the high molecular weight fluororesin is responsible for binding properties, whereby each of the diffusion layer pastes has a balance of both water repellency and binding properties. By way of specific example, carbon paper (TGPH060H, product of Toray Industries, Inc.) serving as the substrate of the diffusion layers is immersed in a dispersion of FEP (tetrafluoroethylene-hexafluoropropylene copolymer), dried at 60° C. for one hour, and then subjected to heat treatment (FEP water repellent treatment) at 380° C. for 15 minutes. The above procedure is performed such that the carbon paper to FEP weight ratio is 95:5 (for the cathode) and is 60:40 (for the anode). Hence, the carbon paper is uniformly subjected to repellent treatment.

Next, carbon black (Vulcan XC72R, product of CABOT Corporation), terpineol (product of Kishida Chemical Co., Ltd.) serving as a solvent, and Triton (nonionic surfactant, product of Kishida Chemical Co., Ltd.) are uniformly mixed at room temperature for 60 minutes by means of a multipurpose mixer (product of DALTON CO., LTD.). In this instance, the mixing is performed such that the weight ratio of carbon black: terpineol: Triton, is 20:150:3 in order to prepare the carbon paste required. A low molecular weight fluororesin (LUBRON LDW40E, product of DAIKIN INDUSTRIES, Ltd.) is mixed with a high molecular weight fluororesin (PTFE30J, product of DuPont) such that the weight ratio of the fluororesins contained in the dispersion (low molecular weight fluororesin:high molecular weight fluororesin) is 20:3, thereby preparing the required cathode-use mixed fluororesin. The above carbon paste is fed to a hybrid mixer container and cooled to 10 to 12° C. The above-described cathode-use mixed fluororesin is added to the cooled carbon paste such that the weight ratio of carbon paste:cathode-use mixed fluororesin (fluororesin components contained in the dispersion), is 31:1. The mixture is mixed for 12 to 18 minutes using a hybrid mixer (EC500, product of KEYENCE CORPORATION) under a mixing mode. The mixing is terminated when the temperature of the paste reaches 50 to 55° C., and the mixing time is adjusted accordingly as appropriate to achieve this temperature range. After the temperature of the paste reaches 50 to 55° C., the mode of the hybrid mixer is switched from the mixing mode to a degassing mode, and degassing is performed for 1 to 3 minutes. The paste after degassing is allowed to self-cool, and the cathode-use diffusion layer paste is completed.

The above-described carbon paste and the low molecular weight fluororesin are fed into a hybrid mixer container such that the weight ratio of carbon paste:low molecular fluororesin (the fluororesin components contained in the dispersion, and hereinafter referred to as an anode-use fluororesin), is 26:3. The mixture is mixed for 15 minutes using a hybrid mixer under a mixing mode. After mixing, the mode of the hybrid mixer is switched from the mixing mode to a degassing mode, and degassing is performed for 4 minutes. When a supernatant is present in the upper portion of the paste after degassing, the supernatant is discarded. Then, the paste is allowed to self-cool, and the anode-use diffusion layer paste is completed. Each of the diffusion layer pastes cooled to room temperature is applied to the surface of the above-described carbon paper subjected to the FEP repellent treatment such that a uniformly applied state is obtained on the surface of the carbon paper. Then, the diffusion layer paste is dried at 60° C. for 60 minutes by means of a hot air dryer (product of Thermal Co., Ltd). Finally, heat treatment is performed at 360° C. for 2 hours, and the diffusion layer is then complete.

A PtRu+WAu/C catalyst (Example 1) is employed at the anode 122. This catalyst is prepared by evaporating gold(Au) compounds onto tungsten (W) to produce a WAu catalyst and adding the WAu catalyst to a PtRu/C catalyst (Pt:Ru =1:, product of Tanaka Kikinnzoku Kogyo K. K.). More specifically, the WAu catalyst is obtained by sublimating a gold-acetylacetate complex under reduced pressure (1 Pa) to evaporate gold onto the W and subjecting this to heat treatment at 250° C. for 4 hours under an argon atmosphere. It has been known that, when the average diameter of the gold nanoparticles exceeds 10 nm, the CO oxidizing ability decreases abruptly, and that, when the average diameter of the gold nanoparticles falls within the range of about 1 to 5 nm with the peak at 3 nm, outstanding CO oxidizing ability is exhibited.

Furthermore, when the mixing amount of Au with respect to the weight of PtRu is 0.01 wt % or less, the effect of adding the gold nanoparticles is not evident. When the mixing amount is 50 wt % or more, the catalytic function of converting $H_2$ to $H^+$ is lowered, and working costs also increase since gold has a low melting temperature and thus a difficulty arises in undertaking processes such as heat treatment. In view of the balance between CO resistance and working cost, it is conceivable that the mixing amount of gold nanoparticles supported on the W with respect to the weight of PtRu is 10 to 40 wt %, desirably 5 to 10 wt %, and that the mixing amount in terms of the gold nanoparticles with respect to the weight of PtRu is 1 to 10 wt %, desirably 5±1 wt %. In the present embodiment, the evaporation amount is adjusted at the time of evaporation such that the mixing amount in terms of the gold nanoparticles is 5 wt % when the mixing amount of the gold nanoparticles supported on the W is 13 wt %, and the WAu catalyst in which the gold nanoparticles, having a peak at a diameter of 3 nm, are supported by the W are mixed with PtRu/C.

In the case of the fuel cell 110 in which the anode 122 is contaminated with CO, as shown in FIG. 3, the reformed gas contains CO in an amount of several ppm, and this CO has a property that it is prone to stick to the Pt serving as a catalyst. When CO sticks to Pt, the activity of the Pt as a catalyst is lowered, and the anode 122 is brought into a state of overvoltage (20 mV to 30 mV). Ru has a property of extracting, from humidifying water ($H_2O$) or the like supplied with the reformed gas, O or OH required for converting CO to $CO_2$, which does not affect catalysis. Thus, even when CO sticks to Pt, Ru located close to the CO can extract O or OH to thereby convert CO to $CO_2$. However, since the oxidation-reduction potential of Ru is high, the activation energy for the conversion of CO to $CO_2$ cannot be reduced by Ru alone. When Au is present at this reaction site, the conversion of CO to $CO_2$ can be promoted since Au has a property of reducing the activation energy for the conversion of CO to $CO_2$.

Furthermore, when W is present in this reaction site, W exhibits a property of further promoting the function of Au which reduces the activation energy for conversion of CO to $CO_2$, since W has the oxidation-reduction potential close to the oxidation reaction potential (0V) of the anode 122 (see p. 282 of Pourbaix). Therefore, according to this example, when compared to a conventional PtRu/C catalyst, CO poisoning of Pt can be reduced, and the CO resistance of the anode 122 can be improved. In addition to this, the durability of the fuel cell 110 can be improved.

In Example 1, gold nanoparticles supported on W are added to PtRu/C. It is sufficient that the catalyst for the anode 122 of the fuel cell 110 contains: a material (a first catalyst material) having a function of converting a hydrogen source ($H_2$ in the first embodiment) to a proton ($H^+$); a material (an oxygen-supplying material) having a function of supplying O (or OH) required for converting, to $CO_2$, CO which sticks to the first catalyst material and lowers the ability thereof; and a material (a second catalyst material) having a function of reducing the activation energy for the conversion of CO to $CO_2$ in order to facilitate this conversion. Examples of the material which can be employed as the oxygen-supplying material include, in addition to Ru: transition elements (transition metals) such as vanadium (V), chromium (Cr), manganese (Mn), iron (Fe), cobalt (Co), nickel (Ni), copper (Cu), zirconium (Zr), molybdenum (Mo), rhodium (Rh), palladium (Pd), tungsten (W), and iridium (Ir); magnesium (Mg); aluminum (Al); zinc (Zn); and tin (Sn).

Examples of the material which can be employed as the second catalyst material include, in addition to WAu, gold nanoparticles themselves, SnAu (gold nanoparticles supported on tin (Sn)), and CrAu (gold nanoparticles supported on chromium (Cr)). In particular, Sn has an oxidation-reduction potential close to the oxidation reaction potential (0V) of the anode 122 (see p. 479 of Pourbaix) and thus has a property of promoting the function of Au which reduces the activation energy of the conversion of CO to $CO_2$. Therefore, according to this Example, when compared to a conventional PtRu/C catalyst, CO poisoning of Pt can be reduced, and the CO resistance of the anode 122 can be improved. In addition to this, the durability of the fuel cell 110 can be improved.

The fuel cell 110 of this embodiment is produced by employing the above PtRu+WAu/C catalyst in the anode 122. More specifically, for producing the anode 122, PtRu+WAu/C (carbon support, VULCAN XC72, product of CABOT Corporation) is mixed with an electrolyte solution (20% Nafion (registered trademark) solution) in a ratio of PtRu+WAu/C to electrolyte solution of 1:2 to thereby prepare the anode slurry. Next, this anode slurry is applied to the surface of the packed layer 124 which is formed in the diffusion layer 128 by applying the anode-use diffusion layer paste thereto, thereby producing the anode electrode. Furthermore, for producing the cathode 114, Pt/C (carbon support, VULCAN XC72, product of CABOT Corporation) is mixed with an electrolyte solution (20% Nafion (registered trademark) solution) in a ratio of Pt/C to electrolyte solution of 3:8 to thereby prepare the cathode slurry. Next, this cathode slurry is applied to the surface of the packed layer 116 which is formed in the diffusion layer 120 by applying the cathode-use diffusion layer paste thereto, thereby producing the cathode electrode. A solid electrolyte membrane (Nafion (registered trademark) 112) 112 is held between the anode electrode and the cathode electrode and is subjected to hot pressing at about 140° C., thereby producing the fuel cell 110 (Example 1).

Figure 4:
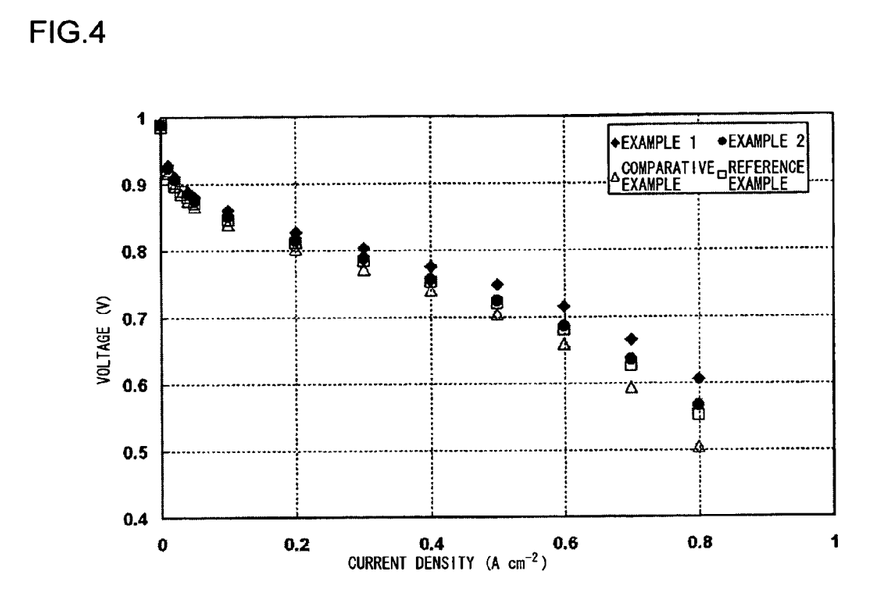
FIG. 4 is a graph showing the current-voltage characteristics of the fuel cell according to Examples 1 and 2 of the present invention.

The fuel cell of Example 2 employs a PtRu+SnAu/C catalyst in the anode. This fuel cell is produced by the same production method as the method used to produce the fuel cell 110 of Example 1, except that SnAu is employed in place of WAu. Furthermore, as a Reference Example, a fuel cell is produced which employed PtRu+Au/C formed by evaporating gold(Au) compounds having a peak at a diameter of 3 nm onto a PtRu/C catalyst such that the amount of the gold nanoparticles is 5 wt % with respect to the weight of PtRu. In addition to this, as a Comparative Example, a fuel cell is produced which employs a conventional PtRu/C catalyst not containing the second catalyst material. FIG. 4 shows the results (current-voltage curves) of current-voltage characteristic measurements by use of the fuel cell (a single cell) of Examples 1 and 2, Reference Example, and Comparative Example. As can be seen in FIG. 4, in the fuel cells containing the second catalyst material, voltage reduction is small even when current density is increased, and thus a stable voltage can be obtained over a wide current range. That is to say that, even when a fuel cell is brought into a state in which the deterioration of the fuel cell progresses rapidly as in a high load state, the fuel cell exhibits resistance thereto. Thus, it is conceivable that, by mixing the second catalyst material, the durability of a fuel cell is improved.

As another example, the following fuel cell can be envisaged. That is, as in Example 1, a WAu catalyst is produced by evaporating gold(Au) compounds onto W, and this WAu catalyst is then added to PtRu/C (product of Tanaka Kikinnzoku Kogyo K. K.) to produce a PtRu+WAu/C catalyst to be employed. However, in this case, in contrast to Example 1, two different types of PtRu/C, containing different Ru amounts, are employed. More specifically, a catalyst A is prepared by adding a WAu catalyst to PtRu/C having a Pt:Ru ratio of 1.4:0.6. In addition, a catalyst B is prepared by adding the WAu catalyst to PtRu/C having a Pt:Ru ratio of 0.6:1.4 (Example 3).

The absolute amount of CO in the reformed gas supplied to the anode 122 does not vary while the reformed gas flows from an inlet to an outlet. However, since the relative amount increases, the influence of CO poisoning is larger near the outlet of the reformed gas than near the inlet. More specifically, assuming that the ratio of components of the reformed gas near the inlet is 80% hydrogen, 20% carbon dioxide, and 10 ppm carbon monoxide, and that the fuel cell 110 is operated at a fuel utilization ratio of 70%, then the ratio of the components near the outlet is about 55% hydrogen, about 45% carbon dioxide, and about 23 ppm carbon monoxide. Thus, the concentration of carbon monoxide near the outlet is increased and is approximately two or more times of that at the inlet. Hence, in Example 3, two types of catalysts are employed in which the Ru amount (relative amount) in one of the catalysts is two times or more of that in the other. According to Example 3, the CO resistance of the anode 122 can be enhanced, and thus the durability of the fuel cell 110 can be improved as in Example 1. In addition to this, it is reasonable to assume that the anode 122 has uniform CO resistance.

Figure 5:
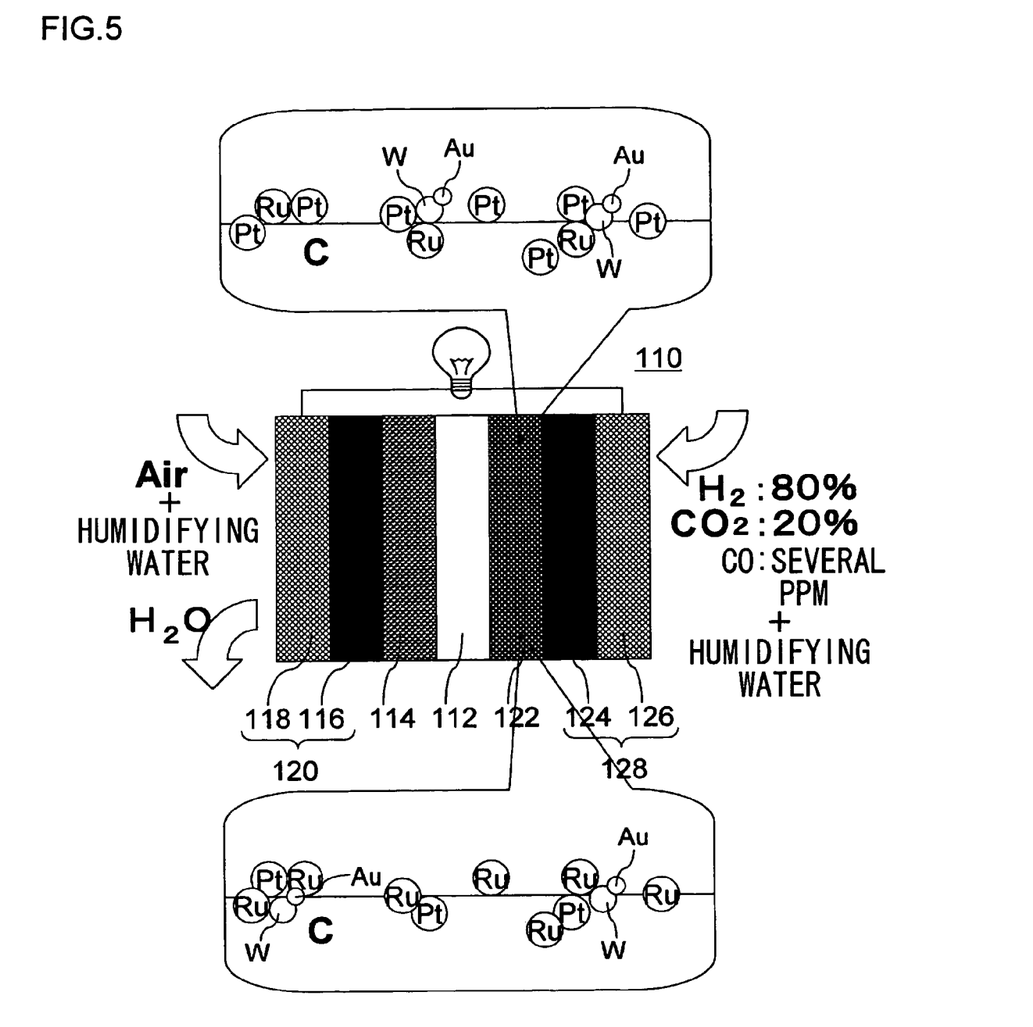
FIG. 5 is a schematic diagram illustrating the configuration of the fuel cell according to Example 3 of the present invention.

The fuel cell 110 of this Example is produced by employing the above two types of catalysts at the anode 122 (FIG. 5). An electrolyte solution is mixed with each of catalyst A and catalyst B such that the ratio of the catalyst and the electrolyte solution is 1:2, thereby producing an anode slurry A and an anode slurry B. The anode electrode is produced as follows. The anode slurry A is applied to the upper half of the diffusion layer 128 having the packed layer 124 formed by applying the diffusion layer paste thereto, the upper half being located near the inlet of the reformed gas. The anode slurry B is applied to the lower half of the diffusion layer 128 having the packed layer 124 formed by applying the diffusion layer paste thereto, the lower half being located near the outlet of the reformed gas. Furthermore, for producing the cathode 114, Pt/C is mixed with an electrolyte solution in a Pt/C to electrolyte solution ratio of 3:8 to thereby prepare the cathode slurry. This cathode slurry is applied to the surface of the packed layer 116 which is formed in the diffusion layer 120 by applying the cathode-use diffusion layer paste thereto, thereby producing the cathode electrode. The solid electrolyte membrane 112 is held between the anode electrode and the cathode electrode and is subjected to hot pressing at about 140° C., thereby producing the fuel cell 110.

SECOND EMBODIMENT

Figure 6:
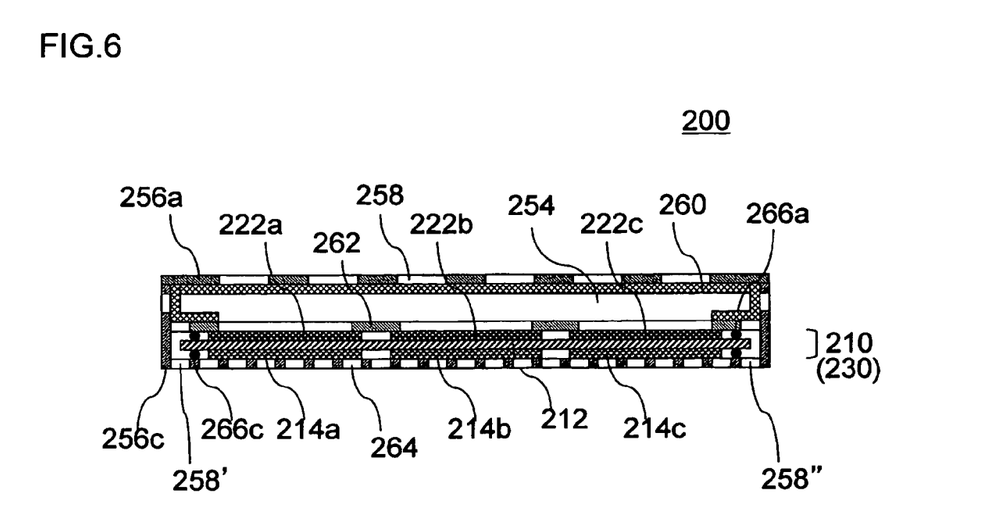
FIG. 6 is a schematic diagram illustrating the configuration of a mobile-use fuel cell system employing the fuel cell according to the present invention.

In this embodiment, with reference to FIG. 6, a description will be given of a fuel cell 210 employed in a mobile-use fuel cell system 200. The fuel cell 210 is a direct methanol fuel cell (DMFC) in which an aqueous solution of methanol or pure methanol (hereinafter referred to as "methanol fuel") is supplied to anodes 222 (222a, 222b, and 222c). The fuel cell 210 includes a catalyst coated membrane (CCM) 230 serving as a power generation unit and which is formed by sandwiching a solid polymer membrane 212 between cathodes 214 (214a, 214b, and 214c) and the anodes 222 without using a diffusion layer.

The methanol fuel to be supplied to the anodes 222 is supplied to a fuel chamber 254 from outside of the fuel cell 210 through a methanol fuel supply hole (not shown). The methanol stored in the fuel chamber 254 is supplied to each of the anodes 222. At the anodes 222, the reaction of methanol occurs as indicated in the chemical equation (3). Furthermore, $H^+$ moves to the cathodes 214 through the solid polymer membrane 212, and electrical power is drawn. As is clear from the chemical equation (3), carbon dioxide is generated from the anodes 222 through this reaction. Thus, a gas-liquid separation filter 260 is placed between the fuel chamber 254 and a plurality of anode-side product discharge holes 258', 258" provided in an anode-side enclosure 256a of the mobile-use fuel cell system 200.

This gas-liquid separation filter 260 is a planar filter having fine holes which selectively pass gas components and do not pass liquid components. A material having methanol (alcohol) resistance is suitable as the filter material. Furthermore, a lightweight material having stiffness and corrosion resistance is suitable as the material for an enclosure 256 (the anode-side enclosure 256a and a cathode-side enclosure 256c). Examples of a suitable material include a synthetic resin and metals such as an aluminum alloy, a titanium alloy, and stainless steel. Further to this, tempered glass or a skeleton resin may also be employed. As in the gas-liquid separation filter 260, the enclosure 256 has a portion contacting the methanol fuel. Thus, preferably, a composite material formed by applying a fluorine-based synthetic resin onto the above synthetic resin or metal is employed, particularly in the portion contacting the methanol fuel. Furthermore, reference numeral 262 indicates a support member 262 which forms the fuel chamber 254 and tightens the CCM 230. Preferably, a material the same as. that for the portion contacting the methanol fuel in the enclosure 256 is employed as the support member 262.

Air is supplied to the cathodes 214 through a plurality of cathode-side product discharge holes 264. Oxygen in the air reacts with $H^+$ arriving at the cathodes 214 through the solid polymer membrane 212 to form product water. The cathode-side product discharge holes 264 supply air to the cathodes 214 and discharge product water from the cathodes 214. These cathode-side holes 264 are provided such that the total area thereof is almost the same as the total area of the anode-side product discharge holes 258. However, the number of the cathode-side holes 264 is larger than the number of the anode-side holes 258, and the diameter of the cathode-side holes 264 is smaller than that of the anode-side holes 258. Moreover, the inner wall of the cathode-side product discharge holes 264 and the surface of a portion of the cathode-side enclosure 256c which has these holes 264 provided therein are coated with a functional coating material containing a photocatalyst such as titanium oxide. The product water discharged from the cathodes 214 is prevented from dripping by provision of a large number of small holes. Furthermore, by coating the inner wall with the functional coating material, the product water spreads thinly over the surface of the inner wall without clogging the holes. Thus, the product water evaporation is facilitated, and breeding of microorganisms or the like can be prevented.

Preferably, this functional coating material contains a metal such as silver, copper, or zinc in order for an organic material decomposition function and an antimicrobial function to be activated even when the mobile-use fuel cell system 200 is not irradiated with light, such as sunlight, containing a specific wavelength for activating photocatalysis. Furthermore, when a user of the mobile-use fuel cell system 200 touches the fuel cell system 200, organic materials may adhere to the fuel cell system 200. When the entire surface of the enclosure 256 is coated with the functional coating material, any adhered organic materials can decompose. In this manner, a soil resistant function or an antimicrobial function can be provided for the mobile-use fuel cell system 200. In order to prevent the methanol fuel from flowing from the anodes 222 to the cathodes 214, O-rings 266 (an anode-side O-ring 266a and a cathode-side O-ring 266c) are placed so as to surround the CCM 230. In this embodiment, the O-rings 266 are compressed by the cathode-side enclosure 256c and the support member 262 to prevent the methanol fuel from flowing from the anodes 222 to the cathodes 214 and to prevent oxygen from flowing into the anodes 222. Preferably, the O-rings 266 are made of a material having flexibility and corrosion resistance.

A PtRu+CrAu/C catalyst (Example 4) is employed at the anode 222. This catalyst is prepared by evaporating gold(Au) compounds onto Cr to produce a CrAu catalyst and adding the CrAu catalyst to PtRu/C (Pt:Ru=1:1, product of Tanaka Kikinnzoku Kogyo K. K.). More specifically, the CrAu catalyst is obtained by sublimating a gold-acetylacetate complex under reduced pressure (1 Pa) to evaporate gold onto the Cr and subjecting this to heat treatment at 250° C. for 4 hours under an argon atmosphere. Since the weight and dimensions of the gold nanoparticles are the same as those in Example 1, a description thereof will be omitted. The difference of Example 4 from Example 1 is that Cr is employed as the second catalyst material in Example 4. In contrast to W, Cr does not have an oxidation-reduction potential around 0V. Therefore, although Cr has poor ability to further improve the function of Au, which facilitates the conversion of CO to $CO_2$, Cr is superior to W in its ability to draw O or OH from $H_2O$.

The fuel cell 210 of Example 4 is produced by employing the above PtRu+CrAu/C catalyst at the anodes 222. More specifically, to produce the anodes 222, the PtRu+CrAu/C is mixed with an electrolyte solution in a ratio of PtRu+CrAu/C to electrolyte solution of 1:2 to thereby prepare the anode slurry. Next, this anode slurry is applied to one surface of the solid polymer membrane (Nafion 115, product of DuPont) 212. Furthermore, to produce the cathodes 214, Pt/C is mixed with an electrolyte solution in a ratio of Pt/C to electrolyte solution of 3:8 to thereby prepare the cathode slurry. Next, this cathode slurry is applied to the other surface of the solid polymer membrane 212, thereby producing the fuel cell 210.

Figure 7:
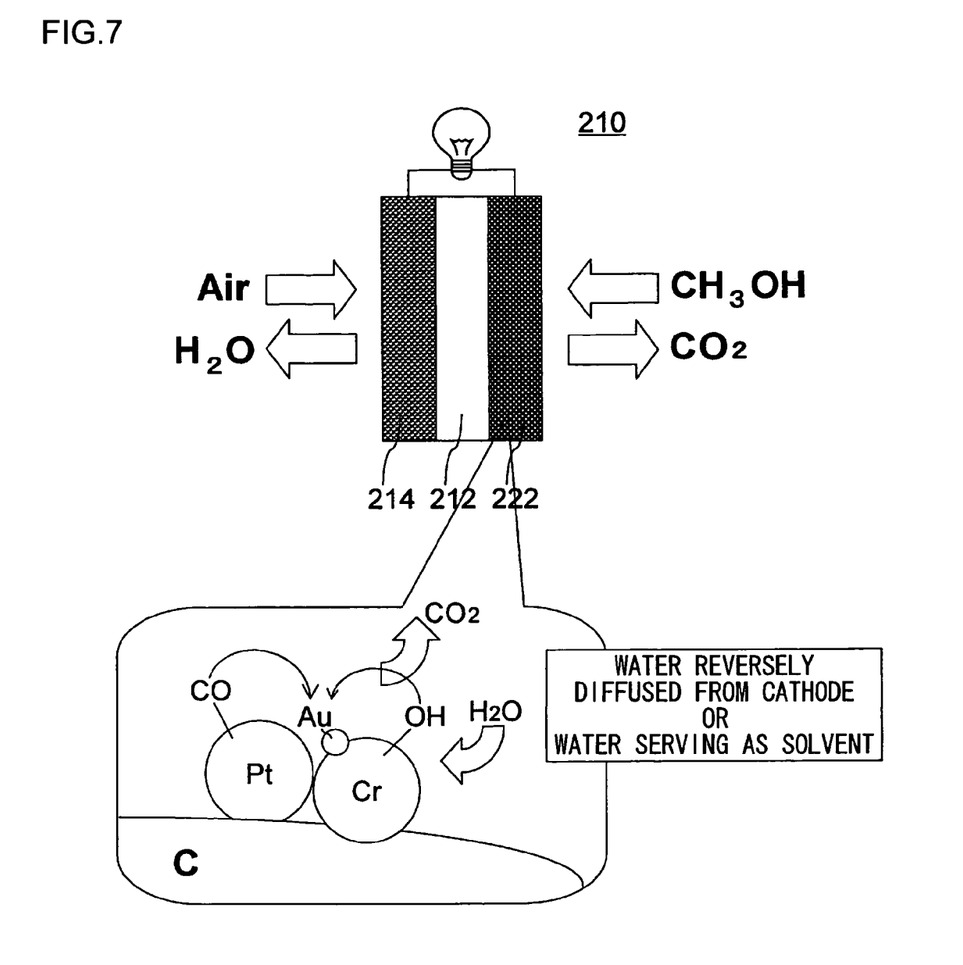
FIG. 7 is a schematic diagram illustrating the configuration of the fuel cell according to Example 5 of the present invention.

As described above, Cr has an excellent oxygen supplying function which is however not as good as that of Ru. Thus, in view of the cost of Ru, an example (Example 5) can be envisaged in which the same material is employed for the oxygen-supplying material and the second catalyst material. More specifically, a PtCr+Au/C catalyst is employed in which gold nanoparticles are evaporated onto PtCr/C (Pt:Cr=1:1) (see FIG. 7). The PtCr+Au/C catalyst is obtained by sublimating a gold-acetylacetate complex under reduced pressure (1 Pa) to evaporate gold compound onto the PtCr/C and subjecting this to heat treatment at 250° C. for 4 hours under an argon atmosphere. When the supported amount of gold with respect to the weight of PtCr is 0.01 wt % or less, the effect of supporting the gold nanoparticles is not evident. When the supported amount of gold is 50 wt % or more, working costs increase since gold has a low melting temperature and thus a difficulty arises in undertaking processes such as heat treatment. In view of the balance between CO resistance and cost, it is conceivable that the supported amount of gold is 1 to 10 wt %, desirably 5±1 wt %. Therefore, gold nanoparticles having a peak at a diameter of 3 nm are evaporated onto the PtCr/C such that the supported amount is adjusted to 5 wt % at the time of evaporation. Since the method for producing the fuel cell 210 of Example 5 by use of the above PtCr+Au/C catalyst at the anodes 222 is the same as that in Example 4, a description thereof will be omitted.

Figure 8:
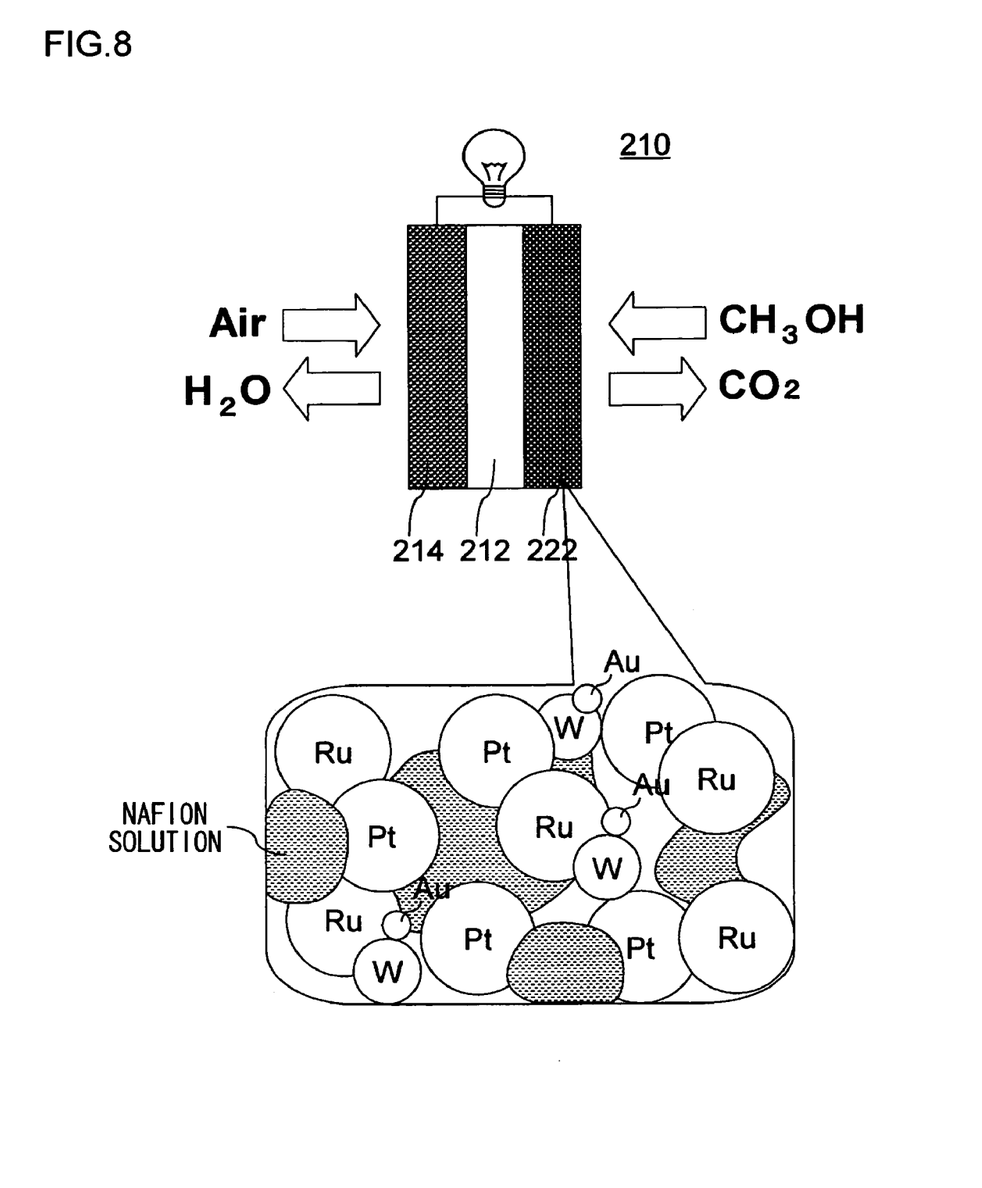
FIG. 8 is a schematic diagram illustrating the configuration of the fuel cell according to Example 6 of the present invention.

Moreover, two types of PtCr+Au/C having different Au amounts may be employed in order to produce a difference in the Au amount between the fuel inlet and the fuel outlet, as in Example 3. More specifically, PtCr/C is employed as the catalyst A, and a PtCr+Au/C similar to that in Example 4 is employed as the catalyst B. As with other Examples, and in the case of the DMFC, Pt black or PtRu black may be employed in place of Pt/C or PtRu/C. When Pt or PtRu not supported on C is utilized as a catalyst, the average particle size of the Pt black or the PtRu black is 0.004 μm. Therefore, although W, Sn, or Cr may be supported on C so as to align with Pt or PtRu as in Examples 1 to 5, the W onto which gold compounds are evaporated is supported on PtRu black (or Pt black) as shown in FIG. 8 (Example 6). In this case, a material for supporting a gold nanoparticle may be Sn or Cr.

Table 1 summarizes the proposed Examples.

TABLE 1

| COMPONENT | PRIMARY FUNCTION | EXAMPLE 1 | EXAMPLE 2 | EXAMPLE 3 | EXAMPLE 4 | EXAMPLE 5 | EXAMPLE 6 |
|---|---|---|---|---|---|---|---|
| FIRST CATALYST MATERIAL | PROMOTING REACTION OF CONVERTING HYDROGEN TO PROTON | PLATINUM | PLATINUM | PLATINUM (GRADIENT) | PLATINUM | PLATINUM | PLATINUM |
| SECOND CATALYST MATERIAL | PROMOTING REACTION OF CONVERTING CARBON MONOXIDE TO CARBON DIOXIDE | GOLD | GOLD | GOLD | GOLD | GOLD | GOLD |
| OXYGEN-SUPPLYING MATERIAL | SUPPLYING OXYGEN FOR REACTION ON SECOND CATALYST MATERIAL | RUTHENIUM | RUTHENIUM | RUTHENIUM (GRADIENT) | RUTHENIUM | CHROMIUM | RUTHENIUM |
| FIRST SUPPORTING MATERIAL | SUPPORTING EACH MATERIAL EXCEPT FOR THE SECOND CATALYST MATERIAL GIVING-RECEIVING | AMORPHOUS CARBON | AMORPHOUS CARBON | AMORPHOUS CARBON | AMORPHOUS CARBON | AMORPHOUS CARBON | |

TABLE 1-continued

| COMPONENT | PRIMARY FUNCTION | EXAMPLE 1 | EXAMPLE 2 | EXAMPLE 3 | EXAMPLE 4 | EXAMPLE 5 | EXAMPLE 6 |
|---|---|---|---|---|---|---|---|
| SECOND SUPPORTING MATERIAL | ELECTRON TO-FROM FIRST CATALYST MATERIAL SUPPORTING SECOND CATALYST MATERIAL REDUCING POTENTIAL OF REACTION ON SECOND CATALYST MATERIAL | TUNGSTEN | TIN | TUNGSTEN | CHROMIUM | CHROMIUM | TUNGSTEN |

It is conceivable that a transition element (transition metal) selected from group 3 to group 11 of the periodic table (from group 3A to group 7A, group 8, and group 1B) can be primarily employed as a second supporting material which supports gold nanoparticles, as shown in Table 1. Specific examples of the second supporting material include magnesium (Mg), aluminum (Al), vanadium (V), chromium (Cr), manganese (Mn), iron (Fe), cobalt (Co), nickel (Ni), copper (Cu), zinc (Zn), zirconium (Zr), molybdenum (Mo), ruthenium (Ru), rhodium (Rh), palladium (Pd), tin (Sn), tungsten (W), iridium (Ir), and oxides thereof. These metals or metal oxides include a material which is unstable by itself. The thermal, chemical, and electrochemical stabilities can be maintained by converting a part or all of such a material to a solid solution alloy or carbide.

When the oxidation-reduction potential of the second supporting material is located near the CO oxidizing potential at an anode (−0.1 V to 0.4 V), the CO oxidizing activity of the second catalyst material can be improved. Examples of such a material include W and Sn. Since W and Sn each have an oxidation-reduction potential near the CO oxidizing potential at an anode, W and Sn are considered to be a particularly preferred material for the second supporting material.

In the above embodiments, the description has been given of a fuel cell in which reformed gas containing residual CO is supplied to an anode and a liquid fuel direct supply type fuel cell in which CO is likely to be generated during a reaction process on an anode side, but the present invention is not limited thereto.

What is claimed is:

1. A fuel cell comprising:
an electrolyte layer;
a first electrode provided on one surface of the electrolyte layer; and
a second electrode provided on the other surface of the electrolyte layer, wherein
a reaction fluid to be supplied to the first electrode contains carbon monoxide or carbon monoxide is generated from a reaction fluid having been supplied to the first electrode, and
the first electrode comprises:
   a first catalyst material which has a function of extracting an electron from the reaction fluid;
   a second catalyst material which has a function of reducing activation energy for conversion of the carbon monoxide to carbon dioxide;
   an oxygen-supplying material which supplies oxygen; and
   a first region contacting the reaction fluid having a lower carbon monoxide concentration and a second region contacting the reaction fluid having a higher carbon monoxide concentration, and
a concentration of the second catalyst material in the first region is lower than that in the second region.

2. A fuel cell comprising:
an electrolyte layer;
a first electrode provided on one surface of the electrolyte layer; and
a second electrode provided on the other surface of the electrolyte layer, wherein
a reaction fluid to be supplied to the first electrode contains carbon monoxide or carbon monoxide is generated from a reaction fluid having been supplied to the first electrode,
the first electrode comprises:
   a first catalyst material which has a function of extracting an electron from the reaction fluid;
   a second catalyst material which has a function of reducing activation energy for conversion of the carbon monoxide to carbon dioxide;
   an oxygen-supplying material which supplies oxygen; and
   a first region contacting the reaction fluid having a lower carbon monoxide concentration and a second region contacting the reaction fluid having a higher carbon monoxide concentration,
a concentration of the second catalyst material in the first region is lower than that in the second region, and
the second catalyst material contains gold and a transition metal selected from group 3 to group 11.

3. A fuel cell comprising:
an electrolyte layer;
a first electrode provided on one surface of the electrolyte layer; and
a second electrode provided on the other surface of the electrolyte layer, wherein
a reaction fluid to be supplied to the first electrode contains carbon monoxide or carbon monoxide is generated from a reaction fluid having been supplied to the first electrode,
the first electrode comprises:
   a first catalyst material which has a function of extracting an electron from the reaction fluid;
   a second catalyst material which has a function of reducing activation energy for conversion of the carbon monoxide to carbon dioxide;
   an oxygen-supplying material which supplies oxygen; and
   a first region contacting the reaction fluid having a lower carbon monoxide concentration and a second region contacting the reaction fluid having a higher carbon monoxide concentration,
a concentration of the second catalyst material in the first region is lower than that in the second region, the second catalyst material contains gold and a transition metal selected from group 3 to group 11, and a particle diameter distribution of the gold has a peak within a range of from 1 nm to 5 mn.

4. A fuel cell comprising:

an electrolyte layer;

a first electrode provided on one surface of the electrolyte layer; and a second electrode provided on the other surface of the electrolyte layer, wherein a reaction fluid to be supplied to the first electrode contains carbon monoxide or carbon monoxide is generated from a reaction fluid having been supplied to the first electrode, the first electrode comprises:

a first catalyst material which has a function of extracting an electron from the reaction fluid;

a second catalyst material which has a function of reducing activation energy for conversion of the carbon monoxide to carbon dioxide;

an oxygen-supplying material which supplies oxygen; and a first region contacting the reaction fluid having a lower carbon monoxide concentration and a second region contacting the reaction fluid having a higher carbon monoxide concentration, a concentration of the second catalyst material in the first region is lower than that in the second region, the second catalyst material contains gold and a transition metal selected from group 3 to group 11, and the transition metal has an oxidation-reduction potential within a range in which a standard electrode potential thereof with respect to a standard hydrogen electrode is −0.25 V or more and 0.25 V or less.

5. A fuel cell comprising:

an electrolyte layer;

a first electrode provided on one surface of the electrolyte layer; and a second electrode provided on the other surface of the electrolyte layer, wherein a reaction fluid to be supplied to the first electrode contains carbon monoxide or carbon monoxide is generated from a reaction fluid having been supplied to the first electrode, and the first electrode comprises:

a first catalyst material which has a function of extracting an electron from the reaction fluid;

a second catalyst material which has a function of reducing activation energy for conversion of the carbon monoxide to carbon dioxide;

an oxygen-supplying material which supplies oxygen; and a first region contacting the reaction fluid having a lower carbon monoxide concentration and a second region contacting the reaction fluid having a higher carbon monoxide concentration, and a concentration of the oxygen-supplying material in the first region is lower than that in the second region.

6. A fuel cell comprising:

an electrolyte layer;

a first electrode provided on one surface of the electrolyte layer; and a second electrode provided on the other surface of the electrolyte layer, wherein a reaction fluid to be supplied to the first electrode contains carbon monoxide or carbon monoxide is generated from a reaction fluid having been supplied to the first electrode, the first electrode comprises:

a first catalyst material which has a function of extracting an electron from the reaction fluid;

a second catalyst material which has a function of reducing activation energy for conversion of the carbon monoxide to carbon dioxide;

an oxygen-supplying material which supplies oxygen; and a first region contacting the reaction fluid having a lower carbon monoxide concentration and a second region contacting the reaction fluid having a higher carbon monoxide concentration, a concentration of the oxygen-supplying material in the first region is lower than that in the second region, and the second catalyst material contains gold and a transition metal selected from group 3 to group 11.

7. A fuel cell comprising:

an electrolyte layer;

a first electrode provided on one surface of the electrolyte layer; and a second electrode provided on the other surface of the electrolyte layer, wherein a reaction fluid to be supplied to the first electrode contains carbon monoxide or carbon monoxide is generated from a reaction fluid having been supplied to the first electrode, the first electrode comprises:

a first catalyst material which has a function of extracting an electron from the reaction fluid;

a second catalyst material which has a function of reducing activation energy for conversion of the carbon monoxide to carbon dioxide;

an oxygen-supplying material which supplies oxygen; and a first region contacting the reaction fluid having a lower carbon monoxide concentration and a second region contacting the reaction fluid having a higher carbon monoxide concentration, a concentration of the oxygen-supplying material in the first region is lower than that in the second region, the second catalyst material contains gold and a transition metal selected from group 3 to group 11, and a particle diameter distribution of the gold has a peak within a range of from 1 nm to 5 mn.

8. A fuel cell comprising:

an electrolyte layer;

a first electrode provided on one surface of the electrolyte layer; and a second electrode provided on the other surface of the electrolyte layer, wherein a reaction fluid to be supplied to the first electrode contains carbon monoxide or carbon monoxide is generated from a reaction fluid having been supplied to the first electrode, the first electrode comprises:

a first catalyst material which has a function of extracting an electron from the reaction fluid;

a second catalyst material which has a function of reducing activation energy for conversion of the carbon monoxide to carbon dioxide;

an oxygen-supplying material which supplies oxygen; and
a first region contacting the reaction fluid having a lower carbon monoxide concentration and a second region contacting the reaction fluid having a higher carbon monoxide concentration,
a concentration of the oxygen-supplying material in the first region is lower than that in the second region,
the second catalyst material contains gold and a transition metal selected from group 3 to group 11, and
the transition metal has an oxidation-reduction potential within a range in which a standard electrode potential thereof with respect to a standard hydrogen electrode is −0.25 V or more and 0.25 V or less.

* * * * *